United States Patent
Le Ven et al.

(10) Patent No.: US 8,871,091 B2
(45) Date of Patent: Oct. 28, 2014

(54) FILTRATION ASSEMBLY INCLUDING A BODY, A HEAD, A CARTRIDGE AND MEANS FOR RETAINING THE CARTRIDGE ON THE HEAD AND THE BODY, AND CORRESPONDING FILTRATION CARTRIDGE

(75) Inventors: Arnaud Le Ven, Ergue-Gaberic (FR); Jean-Luc Guichaoua, Combrit (FR)

(73) Assignee: Cummins Filtration, Quimper Cedex (FR)

( * ) Notice: Subject to any disclaimer, the term of this patent is extended or adjusted under 35 U.S.C. 154(b) by 1219 days.

(21) Appl. No.: 12/593,515

(22) PCT Filed: Mar. 26, 2008

(86) PCT No.: PCT/EP2008/053520
§ 371 (c)(1),
(2), (4) Date: Feb. 17, 2010

(87) PCT Pub. No.: WO2008/125438
PCT Pub. Date: Oct. 23, 2008

(65) Prior Publication Data
US 2010/0147754 A1    Jun. 17, 2010

(30) Foreign Application Priority Data
Mar. 28, 2007   (FR) ...................... 07 02243

(51) Int. Cl.
*B01D 29/96* (2006.01)
*B01D 35/16* (2006.01)

(52) U.S. Cl.
USPC .............. 210/232; 210/167.02; 210/DIG. 17; 184/6.23; 123/196 A

(58) Field of Classification Search
None
See application file for complete search history.

(56) References Cited

U.S. PATENT DOCUMENTS

| | | | |
|---|---|---|---|
| 7,661,539 B2* | 2/2010 | Komine et al. | 210/436 |
| 7,718,060 B2* | 5/2010 | Komine et al. | 210/232 |
| 7,871,517 B2* | 1/2011 | Komine et al. | 210/248 |
| 2004/0159600 A1 | 8/2004 | Stankowski | |
| 2007/0102336 A1* | 5/2007 | Komine et al. | 210/232 |
| 2008/0060992 A1* | 3/2008 | Komine et al. | 210/436 |
| 2009/0065420 A1* | 3/2009 | Komine et al. | 210/236 |
| 2010/0147754 A1* | 6/2010 | Le Ven et al. | 210/167.01 |

FOREIGN PATENT DOCUMENTS

| | | |
|---|---|---|
| DE | 19716085 A1 | 10/1998 |
| DE | 102004038814 A1 | 3/2006 |
| EP | 1714688 A1 | 10/2006 |

OTHER PUBLICATIONS

English Language translation of IPER (409) from PCT/EP2008/053520; 6 pages.*
International Search Report of Counterpart Application No. PCT/EP2008/053520 Filed on Mar. 26, 2008.

* cited by examiner

*Primary Examiner* — Robert James Popovics
(74) *Attorney, Agent, or Firm* — Foley & Lardner LLP

(57) ABSTRACT

A filtration assembly is provided for a liquid flowing in an engine or hydraulic equipment, of the type including a body with a head on top thereof, and a cylindrical member for holding a filtration cartridge containing a filtration medium defined by an upper flange and a lower flange. The upper flange is coupled to the head by a first longitudinal retainer. The cartridge includes a second longitudinal retainer interacting with the body. The first retainer having a longitudinal tensile strength lower than the longitudinal tensile strength of the second retainer.

9 Claims, 3 Drawing Sheets

FILTRATION ASSEMBLY INCLUDING A BODY, A HEAD, A CARTRIDGE AND MEANS FOR RETAINING THE CARTRIDGE ON THE HEAD AND THE BODY, AND CORRESPONDING FILTRATION CARTRIDGE

CROSS-REFERENCE TO RELATED APPLICATIONS

This application is a Section 371 National Stage Application of International Application No. PCT/EP2008/053520, filed Mar. 26, 2008 and published as WO 2008/125438 on Oct. 23, 2008, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The disclosure relates to the field of designing and producing filtering assemblies used to filter liquids circulating in motors or hydraulic equipment.

BACKGROUND OF THE DISCLOSURE

Such filtering assemblies consist of a filter body inside of which a filtering cartridge is arranged, which generally has a cylindrical shape and which includes a filtration medium, which can be made for example of paper, cardboard or a felt. This filtration medium is conventionally defined by two end flanges.

Such filtration cartridges generally cooperate with a central tube, secured or not to the flanges, of which the external diameter is adjacent to the internal diameter of the filtration medium so as to limit deformations of the medium due to the pressure exerted inside the filtration assembly.

The lower flanges can be extended so as to have means for installing and holding the cartridge in the filtering assembly. Alternatively, filtration assemblies implementing a tube on which the filtration cartridge is attached are known, in which the tube is permanently mounted in the filtering assembly.

When the cartridge placed in the tank is used up, i.e. when the filtering element no longer performs its role of satisfactory filtration, the used cartridge of the tank is removed and replaced by a new cartridge. In this change, the operator must extract the cartridge from the tank of the filtering assembly in order to be capable of inserting a new cartridge therein.

According to an approach in which the lifting of the filtering assembly lid leads to extraction of the cartridge, a classic solution consists of integrating a support tube in the lid, with the cartridge being held on the support tube by means of a felt seal.

Handling of these filtering assemblies is not easy in practice.

Moreover, to replace the cartridge, the operator must grab the used cartridge by hand in order to separate it from the tank and/or from its support tube. Aside from the unpleasant sensation that this causes, the operator's hands quickly become stained with fluids of which the harmlessness cannot be guaranteed (in particular when they contain heavy metals).

To facilitate the extraction of used cartridges, various solutions have been proposed.

In particular, according to document DE 197 16 085 a filtering assembly is known which is equipped with a lid that cooperates by clipping with the filtration cartridge so that the removal of the lid leads to extraction of the filtration cartridge. The operator then separates the cartridge from the lid by means of any tool, attaches a new cartridge on the lid and replaces the assembly on the tank. The advantage of this solution lies essentially in the fact that, during any intervention, the operator is not forced to directly grab the filtration cartridge and therefore avoids contact with the liquid.

This type of solution, however, applies in a limited manner to tank/lid-type filtering assemblies, i.e. to filtering assemblies in which the circulation of liquid is organized by means of the tank.

In such filtering assemblies, the tank is connected to liquid inlet and outlet conduits and, consequently, is mounted securely on the conduits. In other terms, the filtration cartridge is renewed by removing the lid (which is not coupled to stationary members of its environment other than the tank itself), which, once removed, provides access to the cartridge.

According to another type of arrangement of filtering assemblies, the latter include a head/body assembly in which it is the head (generally a smelted work piece) that is connected to liquid inlet and outlet conduits, and the circulation of liquid is therefore organized by means of this head. In this configuration, once the filtering assembly has been mounted on the conduits, the head is stationary with respect to its environment and the filtration cartridge is renewed by removing the body (for example, by unscrewing it from the head).

However, for this type of configuration, the problem of handling the cartridge during renewal thereof again arises, and this problem cannot be solved with the existing solutions of "tank/lid" assemblies.

Also, a solution has been proposed by document US 2004 159600, which describes a filtering assembly including a head/body assembly in which it is the head that is connected to liquid inlet and outlet conduits, and the circulation of liquid is therefore organized by means of said head. According to this type of assembly, the head is stationary with respect to its environment and the filtration cartridge is renewed by removing the body, by unscrewing it from the head.

The objective of the solution described by this document is to enable the filtration cartridge to be installed on the head while it is coupled to the body (so as to form a single piece therewith), as well as to enable the separation thereof from the cartridge via the head, while it is also coupled to said body (again forming a single piece therewith).

Therefore, the solution described consists of implementing a ring secured to the body (either by bonding or by being made in one piece with the body by molding).

This ring has:
  two studs each having a support surface, between which the upper flange of the cartridge is intended to be supported;
  teeth having groove intended to receive an angular portion of the upper flange of the cartridge.

Thus, before the cartridge is mounted in the filtering assembly, the body equipped with the ring is mounted on the cartridge, by passing the cartridge through the ring, with the upper flange being introduced into the groove of the teeth, then supported on the support surfaces of the lugs, and the cartridge is then coupled to the ring and, consequently, to the body supporting the ring.

The detachment of the cartridge from the body is performed in the reverse manner: once the body has been removed from the head, the cartridge must be misaligned with respect to the axis of revolution of the ring, in order to separate the upper flange from the support surfaces of the lugs, and then to disengage the flange from the groove.

This technique however has a disadvantage.

Indeed, the cooperation of the cartridge with the head involves only the engagement of an extension of the upper flange in a corresponding conduit of the head, with one or more seals being attached to this extension of the flange.

However, at the end of unscrewing of the body from the head, it is not ruled out that, under the effect of gravity, the extension of the upper flange of the cartridge could be disengaged from the head, at a time when the operator relaxes his or her grip on the body, thereby causing the cartridge to fall with the body, involving a risk of soiling the filtering environment with drainage of the fluid remaining in the body.

SUMMARY

An aspect of the disclosure relates to a filtering assembly for a liquid circulating in a motor or hydraulic equipment, of the type including a body mounted by a head, and a cylindrical element intended to support a filtration cartridge including a filtration medium defined by an upper flange and a lower flange, characterized in that said upper flange is coupled to said head by first longitudinal holding means, said cartridge includes second longitudinal holding means intended to cooperate with said body, and in which said first holding means have a longitudinal tensile strength lower than the longitudinal tensile strength of said second holding means.

A filtering assembly enabling the operator to remove the filtration cartridge by means of the body, without having to directly grab the cartridge, is thus obtained.

Indeed, it is sufficient for the operator to separate the body from the head; the removed body includes the cartridge, and it is then sufficient, as will be explained in greater detail below, to separate the cartridge from the body by a simple and quick manipulation, without it being necessary for the operator to grab the cartridge.

The step of removing the body as it holds the cartridge is performed in a manner very simple for the operator owing to the principle of an embodiment of the invention: when the body is separated from the head (it is noted that the head remains stationary during the entire cartridge renewal operation), the first and second longitudinal cartridge holding means are urged, and the first means give under the pulling force exerted by the operator while the second means continue to hold the cartridge.

In other words, when the body is separated from the head, the cartridge is separated from the head while it is held in the body, without any particular intervention by the operator.

In addition, the first means for holding the cartridge on the head of the filtering assembly constitute a notch providing an indication to the operator on the imminence of the detachment of the cartridge (coupled to the body) from the head. Indeed, at the end of the unscrewing, the operator perceives a slight resistance due to the first holding means, which indicates that the cartridge and the body are at the point of becoming detached from the head and that, consequently, the operator must keep his or her grip on the body while continuing the unscrewing, so as to prevent the assembly formed by the cartridge and the body from falling inadvertently (which could soil the environment of the filtering assembly due to splashes of the fluid still present in the body, or even spraying of fluid on the operator, or deterioration of this part of the environment of the filtering assembly due to any impact ceased by the fall of the body containing the filtration cartridge).

Moreover, as will become clearer below, the first holding means enable the cartridge to be held on the head for a period of time during which the cartridge moves longitudinally inside the body, thereby clearing the way for a drainage passage, as will be explained in greater detail below.

According to an advantageous solution, said first holding means are clipping means.

In this way, holding means are obtained with a tensile strength that can be easily calculated and dimensioned.

Furthermore, such holding means are particularly practical to use for the operator when installing the cartridge on the head, by enabling simple and quick installment.

Preferably, said second holding means are borne by said lower flange.

As will become clearer below, it is thus possible to integrate, in the lower existing flange, the second holding means, without major modifications thereof and without generating significant production costs.

In this case, according to an advantageous solution, said second holding means include at least one element projecting radially in the plane of said lower flange, said holding means preferably include four lugs distributed regularly around said flange, and said body has an annular stop intended to cooperate with said lugs.

Holding means are thus obtained that exert a resistance distributed over the periphery of the lower flange, again enabling easy calculation and dimensioning, in particular according to the tensile strength of the first holding means.

Advantageously, said lugs have a disk portion shape.

In this way, the production of lugs with sharp angles, which, subjected to stress, are capable of breaking, can be avoided. Instead, the lug becomes wider at the level of the flange, conferring satisfactory and reliable strength on the lug/flange connection.

According to a specific embodiment, said first holding means have a tensile strength of between 30 N and 50 N, and said second holding means have a tensile strength of between 90 N and 110 N.

Holding means are thus obtained enabling:
each to ensure reliable holding of the cartridge;
the order of separation of the elements, according to the principle of an embodiment of the invention, to be ensured;
each to ensure a separation without excessive force by the operator.

According to another feature, said cylindrical element and said cartridge are secured to one another.

Thus, the number of manipulations necessary in order to renew a cartridge are reduced, as the latter and the cylindrical element are manipulated as a single piece.

According to yet another advantageous feature, said annular stop is positioned at a height inside said body so as to provide a course of travel for said cartridge between an operating position and an intermediate extraction position, in which a passage provided in the central portion of said body is capable of being released along said course of travel so as to enable said liquid to flow, and said body preferably has a base provided with an drainage valve.

It is thus possible, prior to removal of the body from the filtering assembly, to drain the body (whether it contains clean oil or dirty oil), thereby making it possible:
for the operator to work under clean conditions;

to promote the return of liquid to the corresponding tank, avoiding the need to manage (store, remove, etc.) the liquid extracted from the filtering assembly during renewal.

An embodiment of the invention also relates to a filtration cartridge for an assembly for filtering a liquid circulating in a motor or hydraulic equipment, in which said assembly is of the type including a body mounted by a head, and a cylindrical element intended to support said cartridge, and said cartridge includes a filtration medium defined by an upper flange and a lower flange, characterized in that it includes first longitudinal holding means intended to couple said upper flange to said head, and second longitudinal holding means intended to couple said cartridge to said body, and in which said first holding means have a longitudinal tensile strength lower than the longitudinal tensile strength of said first holding means.

BRIEF DESCRIPTION OF THE DRAWINGS

Other features and advantages will become clearer on reading the following description of a preferred embodiment of the invention, provided for illustrative and non-limiting purposes, and the appended drawings in which.

DETAILED DESCRIPTION OF ILLUSTRATIVE EMBODIMENTS

As mentioned above, the principle of an embodiment of the invention lies in the fact of designing a head/body-type filtering assembly so that it includes cartridge holding means on the head and on the body so that, during disassembly, the holding means on the head give way first.

Figure 1:
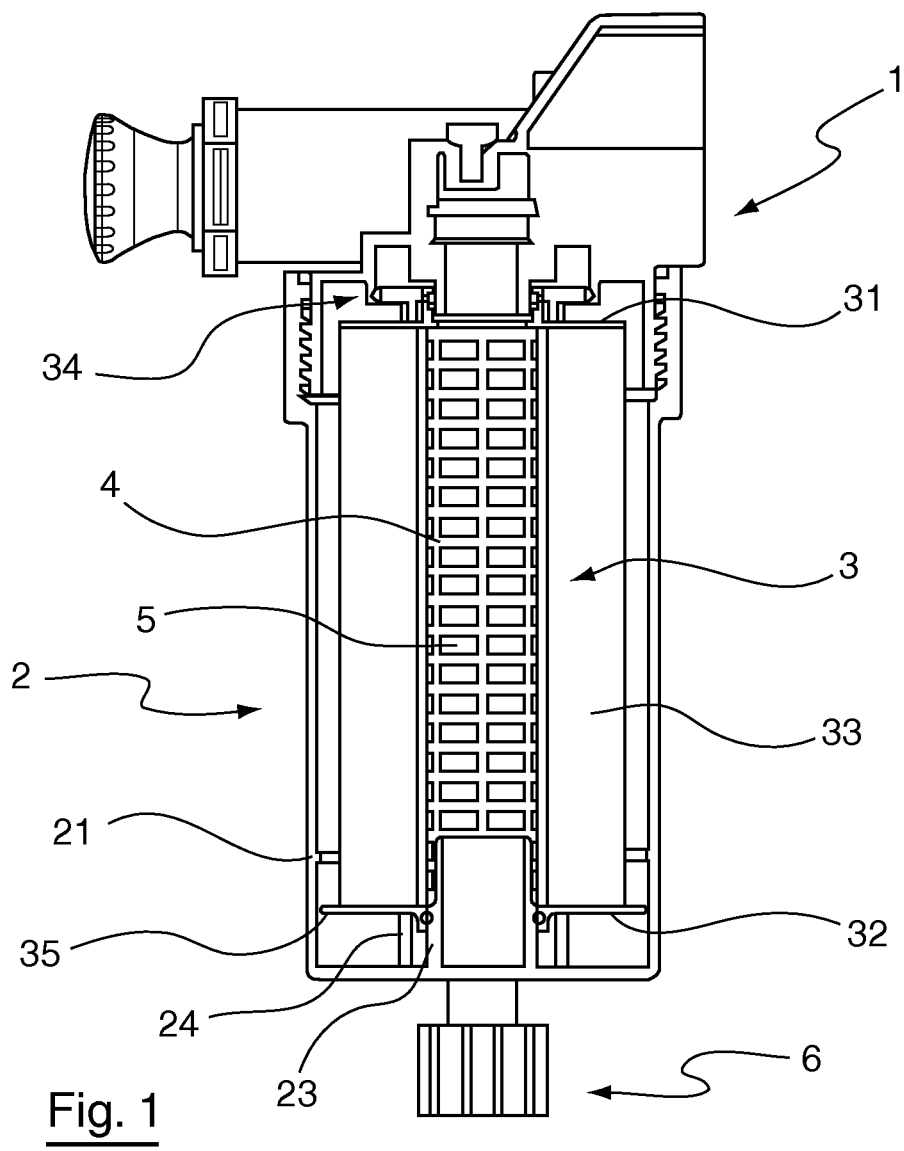
FIG. 1 is a cross-section view of a filtering assembly according to an embodiment of the invention.

Such a filtering assembly is shown in FIG. 1, which shows:
a head 1 (in this case a smelted work piece) having liquid inlet and outlet conduits and intended to be mounted securely on the corresponding conduits connected to the liquid tank and to the motor (or to hydraulic equipment);
a body 2, made of plastic material, screwed onto the head 1;
a filtration cartridge 3 including a filtration medium 33 extending between an upper flange 31 and a lower flange 32;
a cylindrical element 4 (open so as to enable oil to pass into the central recess 5) forming a support for the cartridge 3 in the body 2, which element 4 is, according to this embodiment, secured to the cartridge.

According to the principle of an embodiment of the invention, the upper flange 31 has first holding means (retainer) 34 enabling the cartridge to be coupled to the head 1, in which the cartridge also includes second holding means (retainer) 35 intended to cooperate with the body 2.

Figure 2:
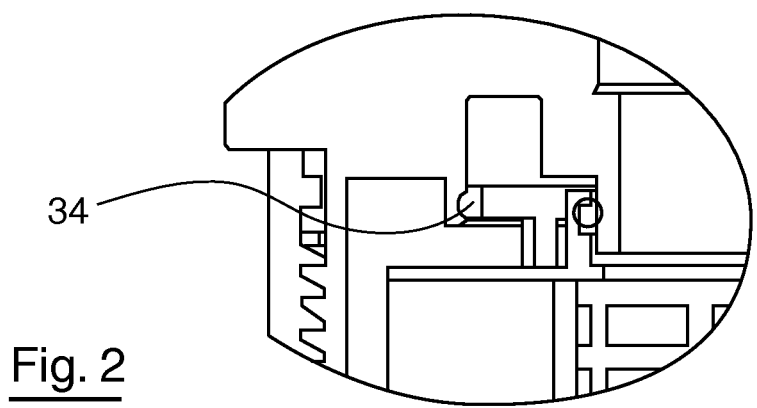
FIG. 2 is a partial cross-section view of a filtering assembly according to an embodiment of the invention, at the level of the first holding means.

In reference to FIG. 2, the first holding means 34 are intended to cooperate with the head at least longitudinally, and more specifically include clipping means (clip) formed by a double crown extending from the upper flange (and perpendicularly thereto), and the ends of each crown are intended to be engaged in an annular groove of the head and to be supported on a lower edge of the head.

Once the holding means 34 are engaged on the head 1, the cartridge is longitudinally held with respect to the head, with a predetermined tensile strength of between 30 N and 50 N. In other words, if a pulling force greater than said predetermined strength is exerted on the cartridge, the holding means are designed to disengage from the head 1, and the cartridge 3 is then separated from the head 1.

Figure 3:
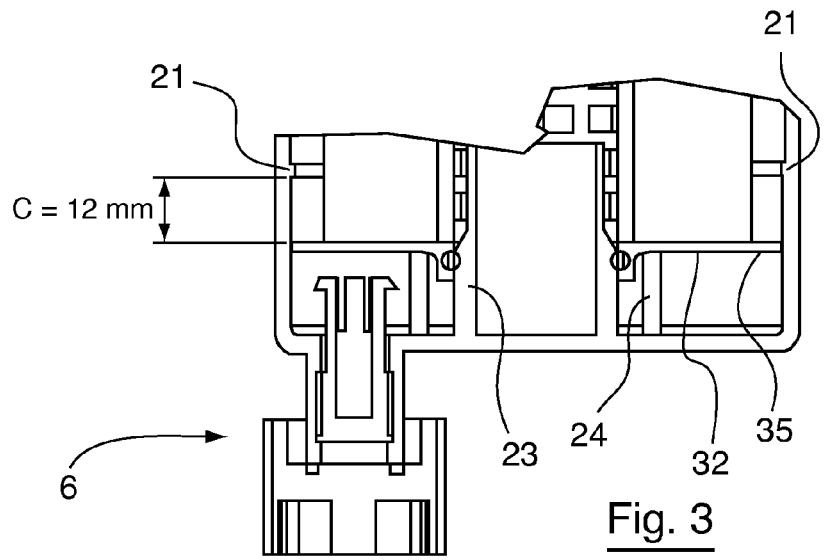
FIG. 3 is a partial cross-section view of a filtering assembly according to an embodiment of the invention, at the level of the second holding means.

Similarly, the second holding means 35 are borne, as shown in FIG. 3, by the lower flange 32, and are intended to cooperate with an annular stop 21 provided on the internal wall of the body 2.

According to this embodiment, the holding means 35 consist of four lugs (FIG. 4) distributed regularly around the flange 32 and projecting radically in the plane thereof.

It is noted that the body 2 is preferably a part obtained by molding a plastic material, and the annular stop 21 is obtained as a direct result of the molding and the mold removal performed forcefully so as to longitudinally disengage the corresponding mold imprint of the body, by causing the stop 21 to bend slightly (the stop has, for the purpose of indication, a thickness of around 0.5 mm).

In addition, when the lugs 35 are in contact with the stop 21, they provide a tensile strength greater than that of the first holding means 34. In other words, when an operator exerts a certain longitudinal pulling force on the cartridge with respect to the body 2, the lugs 35 and/or the stop 21 are intended bend and enable the cartridge 3 to be extracted from the body 2.

By way of indication, the lugs have:
a thickness of 2 mm;
a tensile strength greater than that of the holding means 34, between 90 N and 110 N.

Figure 4:
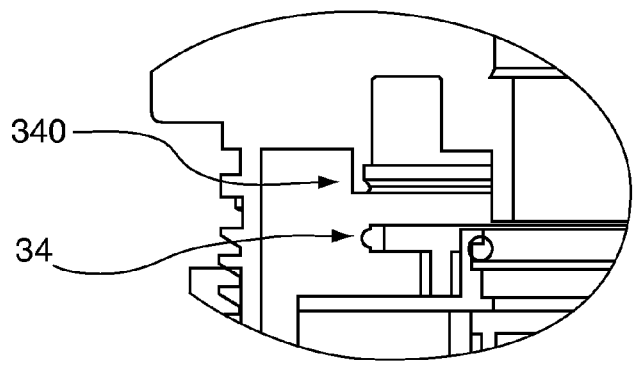
FIG. 4 is a partial cross-section view of a filtering assembly according to an embodiment of the invention at the level of the first holding means, in a cartridge extraction phase.

It is also noted that, as shown in FIG. 4, the lugs 35 have a round shape and extend from the lower flange 32 according to a portion of the disk.

In addition, the annular stop 21 is positioned at a height inside the body 2 so that, when the filtering assembly is operating, the lower flange 32 (and therefore the lugs 35) is below the stop 21.

Thus, during disassembly, the flange 32 travels over a course c (on the order of 12 mm according to this embodiment) before the lugs come into contact with the stop 21.

In addition, the central sleeve 23 (on which the cylindrical element fits 4) extending from the base 22 of the body 2 has a decrease in its external diameter so that, when the cartridge moves in translation over the course c, a passage is formed (between the internal diameter of the cartridge 3 and the external diameter of the sleeve 23) so as to enable the liquid to flow toward the base of the body 2.

The liquid collected in the base of the body 2 can then be emptied by means of a drainage valve 6.

The assembly and disassembly of a filtration assembly like that described above is explained below.

A filtration cartridge is installed as follows:
the filtration cartridge 3 is longitudinally inserted into the body 2, and stress is required to force the lugs 35 to pass over the stop 21 of the body;

the longitudinal engagement of the cartridge in the body is continued until the cylindrical element 4 is fitted on the sleeve 23 and the lower flange 32 is in contact with an annular stop 24 (FIG. 3);

the body 2 integrating the cartridge is screwed onto the head 1, and this operation is accompanied by the engagement of the first holding means 34 in the head 1 (FIG. 2), the screwing being continued until the body 2 is tightly connected to the head 1.

Figure 5:
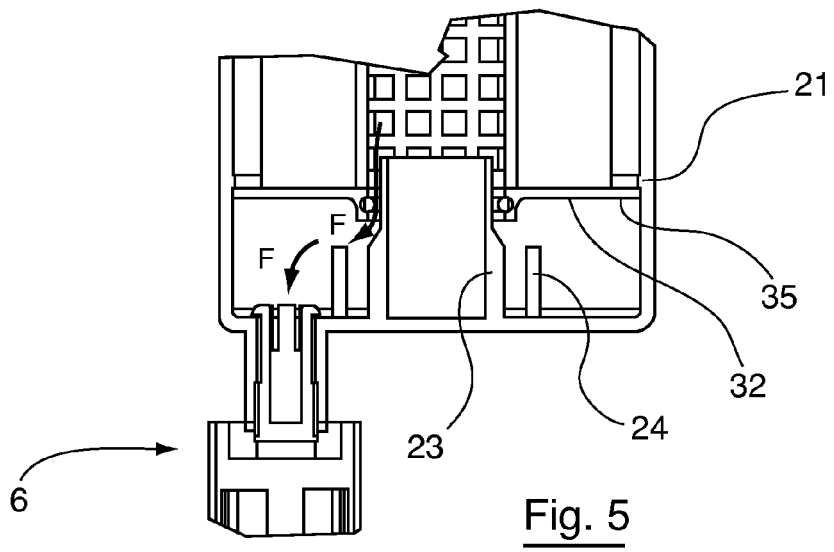
FIG. 5 is a partial cross-section view of a filtering assembly according to an embodiment of the invention, at the level of the second holding means, in a cartridge extraction phase.
Figure 6:
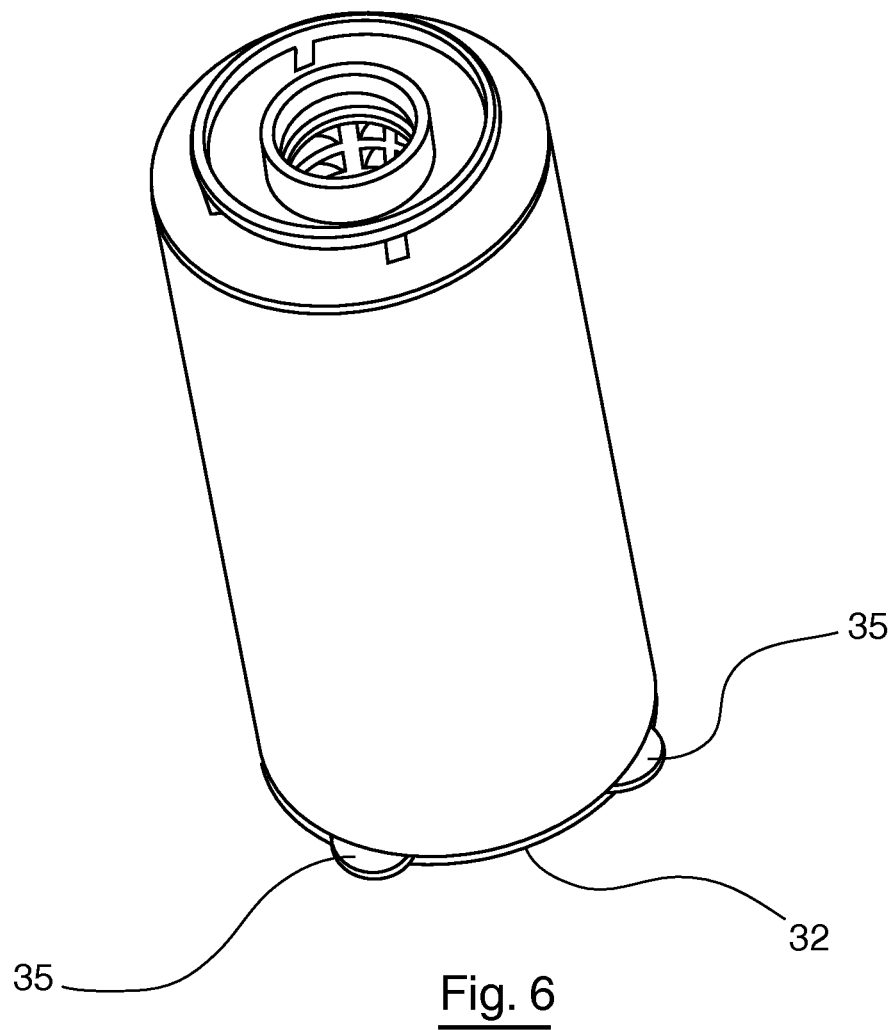
FIG. 6 is a perspective view of a filtration cartridge of a filtering assembly according to an embodiment of the invention.
Figure 7:
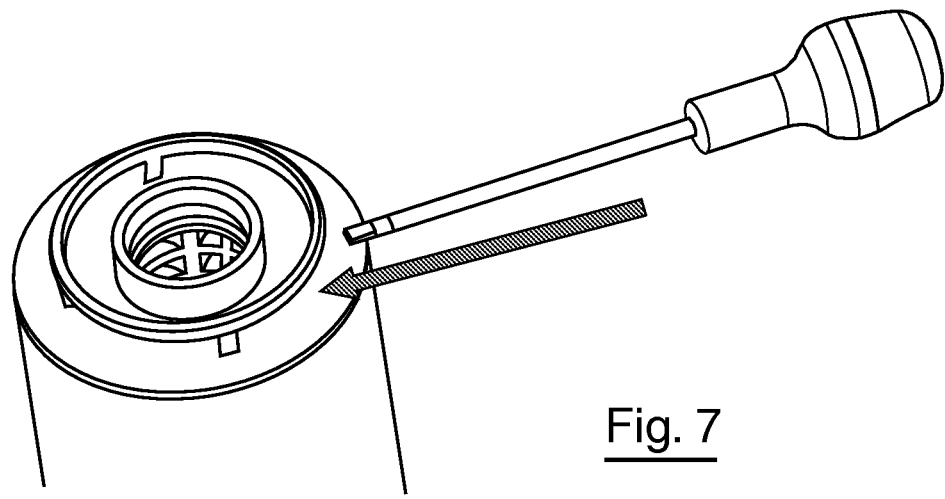
FIG. 7 is a view showing the operation of extraction of the filtration cartridge from a body of a filtering assembly according to an embodiment of the invention.

The cartridge is extracted as follows:

the unscrewing of the body 2 from the head 1 is begun: during a first unscrewing phase, the cartridge remains engaged on the head, thereby causing a translation movement of the cartridge with respect to the body 2, over a distance corresponding to the course c (FIG. 5); the passage of clean liquid (in the central recess) is then allowed between the sleeve 23 and the central recess of the cartridge (as shown by the arrows F indicated in FIG. 5), while the dirty liquid (between the walls of the body 2 and the medium 33) flows between the lugs;

the drainage valve 6 is opened to extract the liquid collected at the bottom thereof from the body 2;

the unscrewing of the body 2 is continued until the lugs 35 come into contact with the stop 21, and the cartridge and the body are secured in translation, thereby tending to produce a pulling force on the cartridge with respect to the head until said force causes the first holding means 34 to be disengaged from the complementary means 340 of the head 1 (FIG. 4); to obtain the disengagement of the first holding means from the complementary means of the head, the operator perceives a slight resistance to the unscrewing, which resistance indicates that the cartridge is at the point of becoming detached from the head and that it is necessary to keep hold of the body while continuing the unscrewing in order to prevent the body containing the cartridge from falling inadvertently at the end of the unscrewing; after complete unscrewing, the body 2 and the cartridge are separated from the head 1;

the cartridge is extracted from the body, for example by inserting a tool 7 (as shown in FIG. 5) under holding means 34 so as to exert a lever effect on the cartridge while holding the body, which lever effect must be greater than the tensile strength of the holding means 35 (thereby causing a slight deformation of the lugs and/or of the stop enabling the lugs to pass over the stop).

In one example, an embodiment of the invention is intended to propose a head/body-type filtering assembly that enables the filtration cartridge to be replaced without requiring the operator to directly contact it.

An embodiment of the invention is also intended to provide such a filtering assembly that enables the filtration cartridge to be installed and removed quickly and easily.

Another objective of an embodiment of the invention is to provide such an assembly that enables the filtering assembly to be easily emptied before it is replaced.

An embodiment of the invention is also intended to provide such a filtering assembly that has a simple design, is easy to implement and inexpensive to produce.

Although the present disclosure has been described with reference to one or more examples, workers skilled in the art will recognize that changes may be made in form and detail without departing from the scope of the disclosure and/or the appended claims.

The invention claimed is:

1. A filtering assembly for a liquid circulating in a motor or hydraulic equipment, the filtering assembly comprising:
a body mounted by a head;
a cylindrical element; and
a filtration cartridge supported by the cylindrical element and including a filtration medium delimited by an upper flange and a lower flange,
wherein said upper flange is coupled to said head by first longitudinal holding means, wherein said filtration cartridge includes second longitudinal holding means cooperating with said body, said lower flange comprising said second holding means,
wherein said first holding means have a longitudinal tensile strength lower than the longitudinal tensile strength of said second holding means,
wherein said second holding means include at least one element projecting radially in a plane of said lower flange configured for cooperating with an annular stop provided on an internal wall of said body, and
wherein said annular stop is positioned at a height inside said body so as to provide a course of travel for said cartridge between an operating position and an intermediate extraction position, in which a passage provided in a central portion of said body is capable of being released along said course of travel so as to enable said liquid to flow.

2. The filtering assembly according to claim 1, wherein said first holding means comprise clipping means.

3. The filtering assembly according to claim 1, wherein said second holding means include at least one element projecting radially in a plane of said lower flange.

4. The filtering assembly according to claim 3, wherein said second holding means include four lugs distributed regularly around said flange, in which an annular stop cooperates with said lugs.

5. The filtering assembly according to claim 4, wherein said lugs have a disk portion shape.

6. The filtering assembly according to claim 1, wherein said first holding means have a tensile strength of between 30 N and around 50 N, and said second holding means have a tensile strength of between 90 N and around 110 N.

7. The filtering assembly according to claim 1, wherein said cylindrical element and said cartridge are secured to one another.

8. The filtering assembly according to claim 1, wherein said body has a base provided with a drainage valve.

9. A filtration cartridge for a filtering assembly for filtering a liquid circulating in a motor or hydraulic equipment, and a cylindrical element intended to support said cartridge, wherein the cartridge comprises:
a filtration medium delimited by an upper flange and a lower flange,
first longitudinal holding means configured to couple said upper flange to a head of the filtering assembly, and
second longitudinal holding means comprises by the lower flange and configured to couple said cartridge to a body of the filtering assembly,
wherein said first holding means have a longitudinal tensile strength lower than the longitudinal tensile strength of said second holding means,
wherein said second holding means include at least one element projecting radially in a plane of said lower flange and configured to cooperate with an annular stop provided on an internal wall of said body of the filtering assembly, and
wherein said cartridge has a course of travel between an operating position and an intermediate extraction position, in which a passage provided in a central portion of said body of the filtering assembly is capable of being released along said course of travel so as to enable said liquid to flow.

\* \* \* \* \*